UNITED STATES PATENT OFFICE 2,465,928

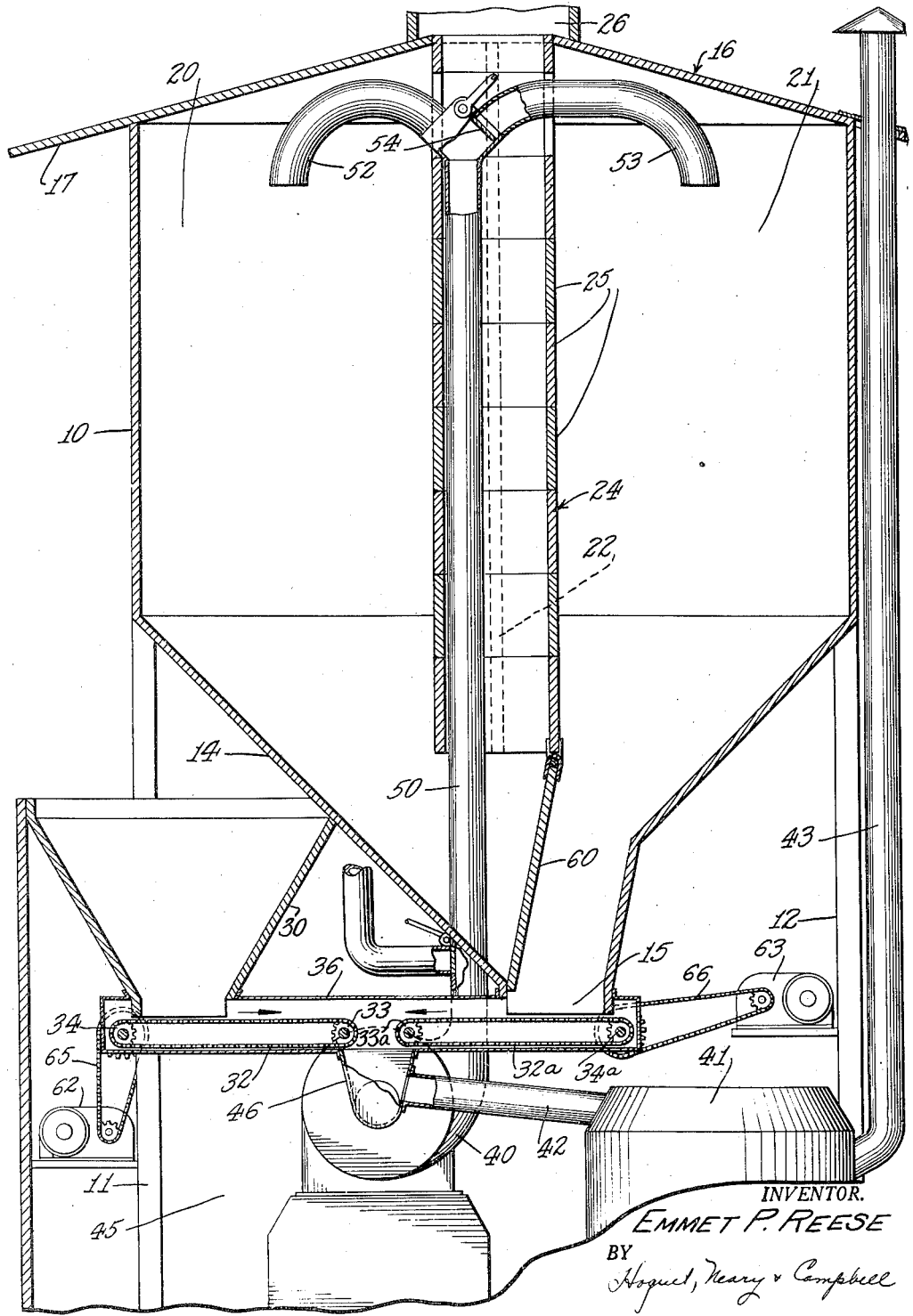

DOUBLE COMPARTMENT HAY DRIER HAVING FLUID CURRENT CONVEYING MEANS

Emmet P. Reese, Shoup, Idaho

Application September 8, 1945, Serial No. 615,203

3 Claims. (Cl. 34—57)

This invention relates to a curing or treating mechanism, more particularly for curing forage for hay.

Curing plants for curing forage for hay by passing the forage or the like to be cured through a curing region are known, but they include no provision for causing the material to make several passes through the curing region, nor any other provision for curing partially cured forage to the required degree without manual re-handling of the partially cured forage.

The principal object of this invention is to provide a curing plant for curing forage for hay which comprises a plurality of compartments or mows with provision for passing the forage through a curing region and then delivering it into either of said mows, and with the further provision of withdrawing the partially cured forage from either of said mows and delivering it into the curing region for further curing and thence into the other mow.

Another object of the invention consists in the provision of a preferred mechanism for carrying out the above stated object.

Other objects of this invention will appear from the following description taken in connection with the drawings in which the single figure is a vertical substantially central sectional view.

The invention will be described with reference to an embodiment which is to be used for curing forage for hay, but, as will appear later, the mechanism disclosed may be used for various other purposes, for example, for curing or treating in any manner other materials and for treating different materials to different degrees or extents, and for partially treating different materials separately and then mixing the materials together and treating them as a single body of material.

The plant described comprises a container or bin 10, which may be of any cross-sectional shape, preferably rectangular, and which may be supported on standards 11 and 12 of any suitable construction. The lower end of the container or bin 10 may be provided with a conical bottom 14, provided with a discharge opening 15, and the bin may be covered by any suitable roof construction 16, the roof of one side of bin being extended to provide a shed roof section 17.

The container or bin may be divided into two compartments or mows 20 and 21 by means of any suitable partition construction 22, and incorporated in the partition construction or located between spaced sections of the partition may be a vertical shaft 24, consisting of boards 25 and which may, if desired, be suspended from the roof 16 in any suitable manner as by cables, not shown, at the four corners of the shaft in the case where the shaft is of rectangular cross-section. If desired alternate boards 25 in front and rear walls of the shaft may be made removable or displaceable to permit access to the mows from the shaft 24. Access to the interior of the shaft may be had from a manhole 26 in the roof 16.

Located below the shed roof 17 and below the conical bottom of the bin is a receiving hopper 30 which may be suitably supported on the frame of the mechanism.

Located below the hopper 30 is a carrier 32, which may consist of slats mounted on flexible members, such as chains passing over sprocket wheels 33 and 34 secured on shafts suitably journaled in the frame of the machine.

Located below the discharge opening 15 of the container or bin 10 is a similar carrier 32a mounted on sprocket wheels 33a and 34a, secured on shafts suitably journaled in the frame of the machine. As indicated by arrows, these carriers move in opposite directions to transport material to the same region. These carriers, together with the discharge ends of the bin 10 and the receiving hopper 30 may be enclosed in a manifold 36.

For the purpose of curing or treating forage for hay the mechanism includes a blower 40 which may be of any suitable type to which heated air may be delivered from a furnace 41 through a hot air pipe 42. The flue 43 of the furnace may extend up along the side of the bin and through the roof as indicated in the drawings. Any suitable screen may be provided on the upper end of the flue to reduce the fire risk.

The blower 40 is provided with an intake or suction opening with which communicates a trough 46 located so as to receive material delivered and discharged by either of the carriers 32 or 32a. The blower draws the material and the hot air from the trough 46 and delivers the treated material through a blower delivery pipe 50, which may be located in the hollow shaft 24, and through either of its outlets 52 and 53 into the mows 20 or 21. For the purpose of controlling the delivery of the material into one or the other of the mows 20 and 21 a suitable valve or gate mechanism 54 may be provided. This gate may be moved so as to close off either of the distributing pipes 52 or 53, and, if desired, it may be provided with any suitable means to hold it in an intermediate position so as to control the amount of material delivered to each of the compartments or mows 20 and 21.

For the purpose of controlling the common discharge opening 15 of the compartments or mows 20 and 21, a gate 60 may be provided which may be hinged to the lower end of the shaft 24 or to the partition 22, if desired, and which may be swung by means located exteriorly of the bin 10 to close the bottom of either of the compartments and connect the bottom of the other compartment to the discharge opening 15, or, if desired, any suitable means may be provided for holding the gate 60 in an intermediate adjusted position to permit discharge of material from both compartments at relatively proportionate rates. Any suitable power device may be employed to operate the blower and the carriers at desired speeds, and the operation and rate of travel of each of the carriers 32 and 32a may be controlled by any suitable clutch and speed control mechanism diagrammatically indicated at 62 and 63, which drives the shafts supporting the sprocket wheels 34 and 34a through belts or sprocket chains 65 and 66. If desired, the blower and each of the carriers may be operated by variable speed motors.

If desired, the blower delivery pipe may be equipped with a branch pipe 67 for delivering the cured forage or other material from either of the compartments into a wagon or truck or the like. The material may be directed either through the main delivery pipe 50 or the branch pipe 67 by means of a valve 68 similar to the valve 54.

While I have illustrated and described a preferred embodiment of my invention, it is to be understood that this has been done for purposes of disclosure and is not to be considered as limiting and that I reserve the right to all such changes as fall within the principles of this invention and the scope of the appended claims.

I claim:

1. In a plant for treating material, the combination of a plurality of compartments, a material receiving hopper adjacent to the lower ends of said compartments, a hollow shaft located between said compartments, a trough below said compartments, a conveyor for delivering material from said hopper to said trough, a second conveyor located below said compartments for delivering material to said trough, means for driving said conveyors, a blower having an intake connected to said trough and an outlet, a conduit connected to said outlet and extending upwardly through said shaft, means at the upper end of said conduit for directing material into said compartments, means for supplying heated gas to said blower, and a gate at the lower ends of said compartments movable into positions to discharge material from either or both of said compartments upon said second conveyor.

2. A device for curing hay and other forage comprising a hopper member having a bottom tapering downwardly to form a discharge outlet, partition means in said member dividing the latter into at least two compartments communicating with said outlet, a gate on the lower edge of said partition means for shutting off communication selectively between said compartments and said outlet, a trough member below said outlet, means for delivering forage from the exterior of said hopper member to said trough member, a blower connected with said trough member for withdrawing said forage from said trough and having a discharge outlet, a conduit extending upwardly from said blower outlet having branches communicating with said compartments, a valve in said conduit for directing said forage selectively through said branches into said compartments, means for delivering said forage from said outlet of said hopper member to said trough, and heating means for introducing heated gases into said conduit to cure said forage as it is blown along said conduit.

3. A device for curing hay and other forage comprising a hopper member having a bottom tapering downwardly to form a discharge outlet, partition means in said member dividing the latter into at least two compartments communicating with said outlet, a gate on the lower edge of said partition means for shutting off communication selectively between said compartments and said outlet, a trough member below said outlet, means for delivering forage from the exterior of said hopper member to said trough member, a blower connected with said trough member for withdrawing said forage from said trough and having a discharge outlet, a conduit extending upwardly from said blower outlet having branches communicating with said compartments, a valve in said conduit for directing said forage selectively through said branches into said compartments, and means for delivering said forage from said outlet of said hopper member to said trough.

EMMET P. REESE.

REFERENCES CITED

The following references are of record in the file of this patent:

UNITED STATES PATENTS

| Number | Name | Date |
| --- | --- | --- |
| 617,385 | Wright | Jan. 10, 1899 |
| 920,602 | Meyer | May 4, 1909 |
| 1,094,452 | Maye et al. | Apr. 28, 1914 |
| 1,909,950 | Harris | May 23, 1933 |
| 2,342,528 | Carbaugh | Feb. 22, 1944 |